United States Patent [19]

Spindler

[11] Patent Number: 4,768,839
[45] Date of Patent: Sep. 6, 1988

[54] METHOD OF MANUFACTURING AXLE ASSEMBLIES

[76] Inventor: Dietmar E. Spindler, 50747 Regency Park Dr., Granger, Ind. 46530

[21] Appl. No.: 940,650

[22] Filed: Dec. 11, 1986

Related U.S. Application Data

[62] Division of Ser. No. 641,705, Aug. 17, 1984, Pat. No. 4,659,005.

[51] Int. Cl.$^4$ .............................................. B60B 35/00
[52] U.S. Cl. ................................ 301/124 R; 301/131
[58] Field of Search ............... 301/124 R, 124 H, 131; 228/112, 113, 114; 29/159.2, 159.3

[56] References Cited

U.S. PATENT DOCUMENTS

| | | | |
|---|---|---|---|
| 1,840,941 | 1/1932 | Eksergian et al. ................... | 29/159.3 |
| 4,087,038 | 5/1978 | Yagi ...................................... | 228/112 |
| 4,363,522 | 12/1982 | Paloucik ............................... | 301/131 |
| 4,569,241 | 2/1986 | Gaiani ............................. | 228/112 X |

FOREIGN PATENT DOCUMENTS

| | | | |
|---|---|---|---|
| 354902 | 12/1937 | Italy .................................. | 301/124 H |
| 565992 | 12/1944 | United Kingdom ............ | 301/124 R |
| 660801 | 5/1979 | U.S.S.R. ............................... | 228/112 |

Primary Examiner—James B. Marbert
Attorney, Agent, or Firm—Barnes & Thornburg

[57] ABSTRACT

An axle assembly includes an axle member, a flange, and a spindle. The flange is provided with a central bore. An end portion of the spindle extends through the central bore of the flange to contact an end of the axle member. A central portion of the spindle contacts a surface of the flange. Separate weld joints are formed between the axle assembly components at the two contact areas. The welding flash around the outer circumference of the weld may be removed to allow for visual inspection. A preferred method of manufacturing the assembly is by a friction or inertia welding process.

8 Claims, 3 Drawing Sheets

METHOD OF MANUFACTURING AXLE ASSEMBLIES

This is a division of application Ser. No. 641,705, filed 8/17/84, now U.S. Pat. No. 4,659,005, issued 4/21/87.

BACKGROUND AND SUMMARY OF THE INVENTION

This invention relates generally to axle assemblies and, more particularly, to certain improvements in welded axle assemblies.

The manufacture of axles for trucks, trailors, and other applications typically involves a combination of welding, machining, and forging operations. For example, a known method involves forging (swaging) a tube or banjo housing on its ends to form a single piece axle/spindle assembly. A flange, such as might be used for braking or wheel mounting, is subsequently attached to the assembly, usually by welding. Another technique involves welding a spindle directly to the ends of a rough forged or machine finished axle tube, followed again by subsequent attachment of the flange. In still another method, two formed halves are joined by welding to produce an axle housing. The spindles and flanges are then attached to the housing by separate welding operations.

A technique for manufacturing an axle assembly by a friction welding process is described in U.S. Pat. No. 4,223,825 to Williams. This method involves welding a spacer tube to a spider, machining the inner bore of the spacer tube to remove material produced by the welding operation, placing the spider/spacer subassembly on the end of the axle tube, and concurrently welding, by friction or inertia welding techniques, a spindle to the spacer and the axle tube.

With the exception of the Williams technique, all of the above discussed methods require a forging operation to directly form the spindle on the axle, or, in the case of separately attached spindles, to reduce the axle end diameter to the spindle diameter for purposes of forming the welded joint. Following attachment or formation of the spindle, subsequent machine or welding operations are required to attach the flange to the spindle/axle assembly. An alternative which reduces or simplifies these manufacturing steps, while providing a structurally advantageous product, is the subject of a related patent application Ser. No. 632,224 by the present inventor entitled "Axle Assembly Arrangement" filed on July 19, 1984 (now abandoned). To the extent appropriate, pertinent disclosure from that application is hereby incorporated by reference into the present application.

In the method described by Williams, no subsequent welding operation is required to attach the flange since the spindle/axle and the flange (i.e., the spider/spacer subassembly) are joined in a single welding operation. Referring to FIG. 6 of the Williams patent, it can be seen that a single weld 16 is formed to simultaneously join the three components. However, also apparent from this figure is that only the outer surface of weld 16 can be visually inspected when the axle assembly is complete. The weld which join end 25 of the axle beam to end portion 32 of the spindle cannot be visually examined. This is also true for the radial inner portion (29) of the weld joins inner portion 30 of the axle beam to outer surface portion 31 of the spindle.

Accordingly, an object of this invention is to provide an improved axle assembly arrangement.

Another object of this invention is to provide an axle assembly arrangement which provides for visual inspection of the individual weld joints formed between the axle components.

Yet another object of this invention is to provide an axle assembly arrangement which is compatible with efficient axle manufacturing techniques, such as friction and inertia welding processes.

These and other objects are attained in an axle assembly arrangement which comprises a spindle, a flange, and an axle member. The spindle has an end portion which is generally circular in cross-section and has a first outer diameter, a central portion which is also circular in cross-section and which has a relatively larger outer diameter, and a connecting transition between the two portions. The connecting transition is preferably a step-like transition which forms a radially extending face on the central portion which is subsequently welded to a surface of the flange. The flange has a central bore which is coaxially aligned with, and spaced apart from, an end of the axle member. The end portion of the spindle extends through the central bore of the flange, allowing the radially extending face of the central portion of the spindle to abut the surface of the flange which faces away from the end of the axle member. An end surface of the end portion of the spindle abuts the end of the axle member. A first weld joint is formed between the abutting surfaces of the central portion of the spindle and the flange. A second weld joint is formed between the abutting surfaces of the spindle end portion and the axle member.

A preferred method of manufacturing the axle assembly of the present invention includes the steps of locating an axle member in a first workholding means, locating a flange having a central bore in a second workholding means such that the central bore of the flange is aligned with and spaced apart from an end of the axle, locating a spindle in a third workholding means, positioning the third workholding means such that an end portion of the spindle extends through the central bore of the flange and such that the central portion of the spindle abuts the surface of the flange, welding the central portion of the spindle to the surface of the flange, and welding the end portion of the spindle to the end of the axle. The two welding steps are preferrably performed concurrently. An especially preferred method includes the additional step of removing the welding flash produced by the welding operation from around an outer circumference of at least one weld to allow for a visual inspection of the weld. The welding steps are preferrably performed by friction or inertia welding techniques.

Other objects and advantages of the present invention will be apparent from the following detailed description of a preferred embodiment, when considered in conjunction with the accompanying drawings.

DETAILED DESCRIPTION OF THE DRAWINGS

Figure 1:
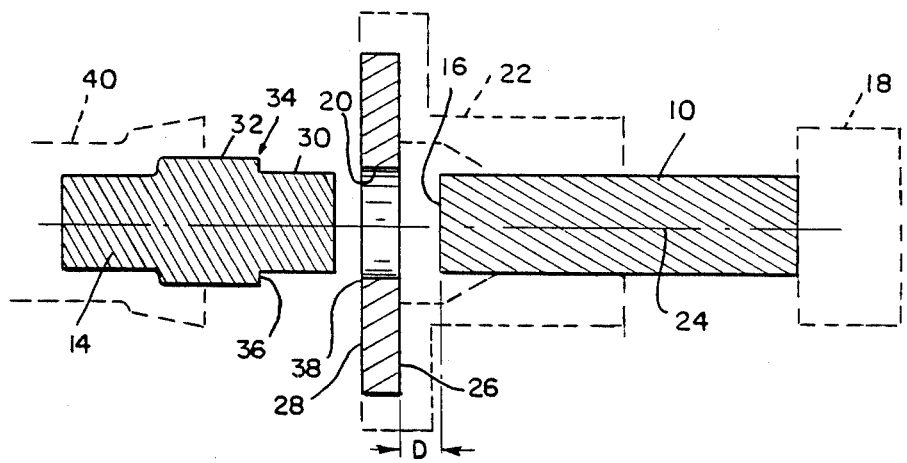
FIG. 1 shows a spindle, a flange and an axle member mounted in respective workholding means prior to assembly, in accordance with the present invention.

FIG. 1 shows the components of an axle assembly prior to formation of the weld joints in accordance with the present invention. The components include axle member 10, flange 12, and spindle 14. Axle member 10 has an end surface 16 which faces the other axle components. Although axle member 10 is depicted in FIG. 1 as a solid member, a tubular (i.e., hollow) axle member may be used as well. Axle member 10 is held in position by stationary workholding means 18 which, in the preferred method described below, is the stationary tailstock member of a friction or inertia welding apparatus.

Flange 12 is provided with a central bore 20 and is held in position by a second workholding means 22. In this preferred embodiment, workholding means 22 is a stationary attachment to the tailstock of the friction welding apparatus and serves to align and hold flange 12 in position, with respect to axle member 10 and spindle 14. Flange 12 is positioned such that central bore 20 is coaxially disposed with respect to common longitudinal axis 24 of axle member 10 and spindle 14. Flange 12 is further positioned in workholding means 22 such that a first flange surface 26, which faces end 16 of axle member 10, is spaced apart from end 16 by a distance D, as indicated in the figures. A second flange surface 28 faces away from end 16 of axle member 10 and towards spindle 14. Flange 12 preferrably serves as a brake flange, or alternatively, a wheel mounting flange when attached to the axle assembly.

Spindle 14 has an end portion 30, a central portion 32 and a connecting transition between portions 30 and 32, indicated generally by reference numeral 34. End portion 30 has a generally circular crosssection and an outer diameter which is slightly smaller than central bore 20 of flange 12. Central portion 32 also has a generally cylindrical cross-section and an outer diameter which is substantially larger than the outer diameter of end portion 30 and central bore 20. Transition 34 is preferrably a steplike transition, as shown in FIG. 1. This steplike transition forms a radially extending surface or face 36 on the side of spindle central portion 32 which faces flange 12. As will be described below, when spindle 14 is positioned for welding to flange 12 and axle 10, face 36 interfaces with a portion 38 of flange surface 28, immediately surrounding central bore 20. The relative diameters of flange central bore 20 and spindle central portion 32 determine the area of interface between face 36 and surface portion 38 as indicated by reference numeral 42 in FIG. 2.

Spindle 14 is shown in FIG. 1 mounted in a third workholding means 40. Workholding means 40 is preferrably the rotatable headstock of a friction or inertia welding apparatus. Although spindle 14 is depicted in FIG. 1 as a solid member, a hollow or tubular spindle member may be used as well.

Figure 2:
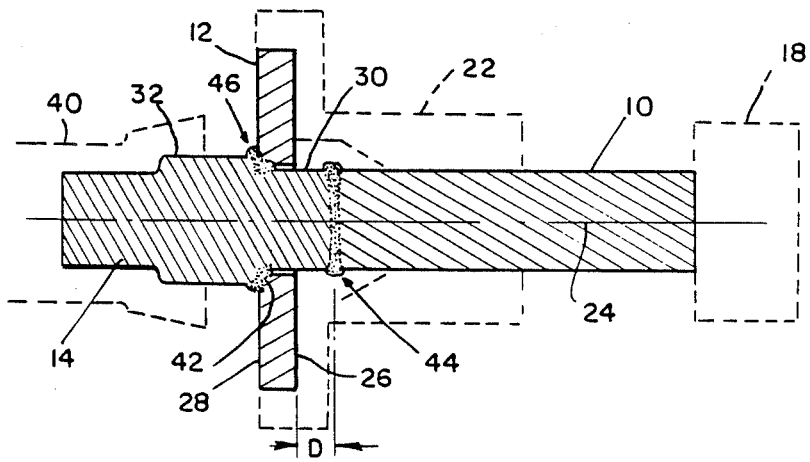
FIG. 2 shows the spindle, flange and axle member of FIG. 1 after formation of the weld joints to complete the manufacture of the axle assembly.

FIG. 2 shows the axle components of FIG. 1 after completion of the welding steps to form the axle assembly. As can be seen in FIG. 2, workholding means 40 is advanced along longitudinal axis 24 until spindle end portion 30 contacts end surface 16 of axle member 10 and face 36 of central portion 32 contacts flange surface portion 38. The longitudinal dimension of end portion 30 and the position of axle member 10 in workholding means 18 are preferably selected so that these respective contacts, and the resulting welding operations, take place simultaneously. Alternatively, spindle 14 may be welded to flange 12 in a first welding operation, followed by the welding of spindle 14 to axle member 10 in a second operation. The weld joint formed between spindle end portion 30 and axle member end surface 16 is indicated generally by reference numeral 44 in FIG. 2. The weld joint formed between spindle center portion 32 and flange surface portion 38 is indicated generally by reference numeral 46 in FIG. 2.

The structure and method described above and illustrated in FIGS. 1 and 2 result in the formation of weld joint 44 in a first generally vertical (as viewed in FIG. 2) plane and formation of weld joint 46 in a second generally vertical plane which is spaced apart from the first plane by the distance D plus the thickness of flange 12. So positioned, the welding flash around the outer circumference of both weld joints can be removed, if desired. Removal of the flash allows for a visual inspection of both weld joints 44 and 46.

As noted, a preferred method of forming weld joints 44 and 46 is by a friction or inertia welding process. The positioning and alignment of the axle assembly components, as described above, is readily accomplished using a friction welding apparatus. Welds 44 and 46 may then be individually, or concurrently, formed.

Figure 3:
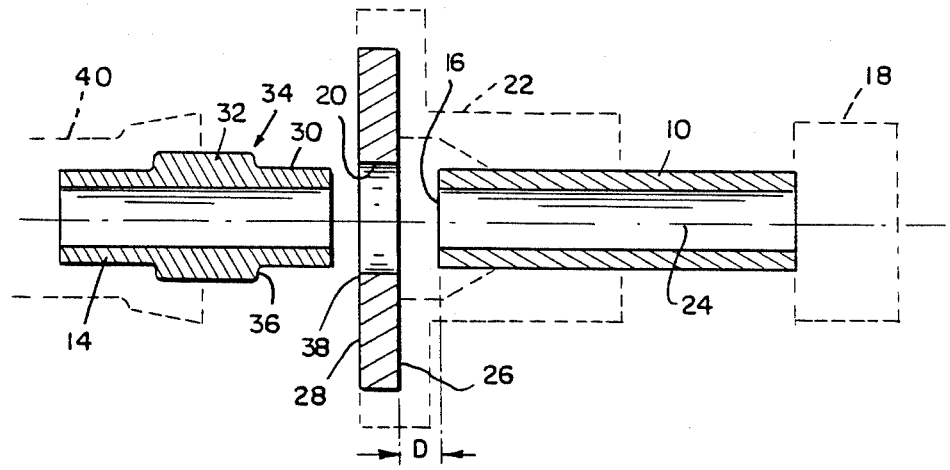
FIG. 3 shows the arrangement of FIG. 1 for an axle assembly comprising a hollow, tubular spindle and axle member.
Figure 4:
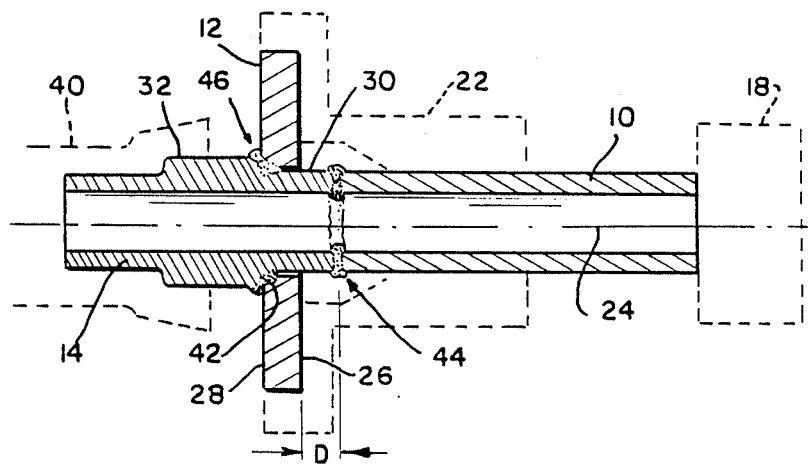
FIG. 4 shows the arrangement of FIG. 2 for an axle assembly comprising a hollow, tubular spindle and axle member.

FIGS. 3 and 4 illustrate the method and structure described above for an axle assembly comprising a tubular spindle and axle member. For purposes of clarity, the same reference numerals used in FIGS. 1 and 2 are assigned to corresponding structures in FIGS. 3 and 4.

Figure 5:
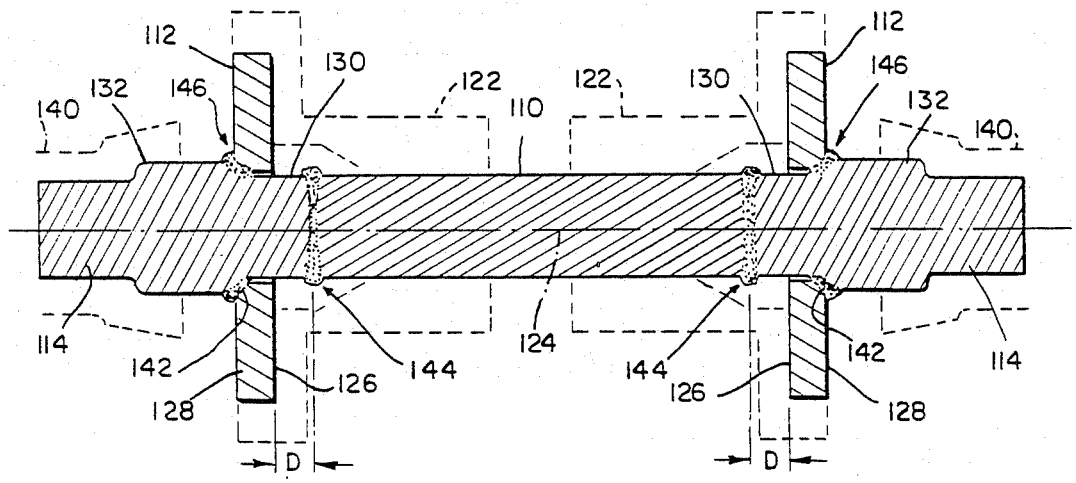
FIG. 5 shows a solid axle assembly mounted on a double-ended welding machine.
Figure 6:
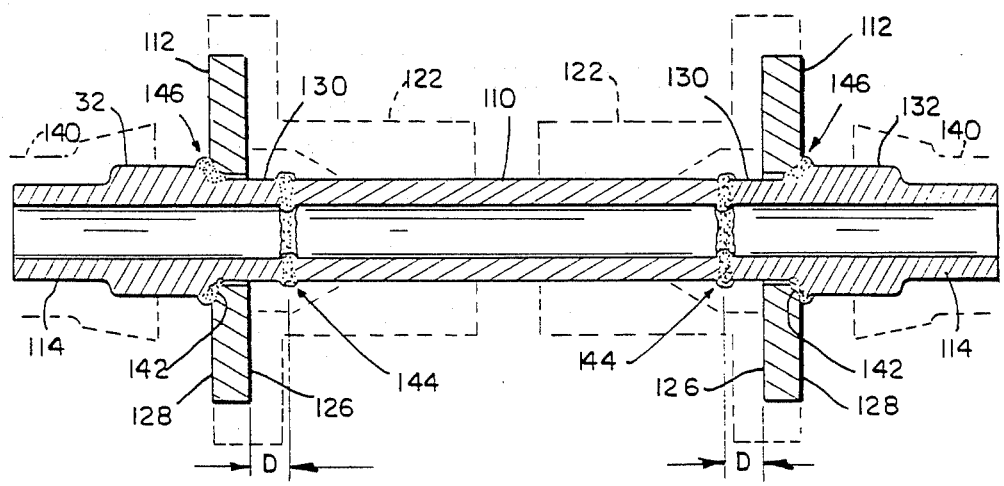
FIG. 6 shows a hollow axle assembly mounted on a double-ended welding machine.

FIGS. 5 and 6 show, respectively, solid and hollow axle assemblies as manufactured on a double-ended friction welding machine. The reference numerals in these figures have been increased by one hundred, but otherwise correspond to the numerals used in FIGS. 1-4. Using the double-ended welding machine, flanges 112 can be mounted in workholders 122 in a preferred relative angular orientation and then welded to spindles 114 without disturbing the orientation of either flange.

Although the invention has been described in terms of a detailed preferred embodiment, it is to be understood that this description is to be taken by way of illustration and example only, and not by way of limitation. The spirit and scope of the invention is to be limited only by terms of the appended claims.

What is claimed is:

1. An axle assembly for a vehicle comprising:
  an axle member having an outer surface on an end thereof;
  a flange having a central bore coaxially aligned with and axially spaced apart from the end of the axle member, and having a first surface facing away from the end of the axle member; and
  a spindle having an end portion which extends through the central bore of the flange and which is welded to the outer surface on the end of the axle member, and said spindle having a central portion which is welded to the first surface of the flange, wherein the central portion and end portions of the spindle are generally circular in cross-section and wherein an outer diameter of the central portion is substantially larger than an outer diameter of the end portion.

2. The axle assembly according to claim 1, wherein a transition from the central portion to the end portion of the spindle is a step-like transition and, wherein a radially extending face of the step-like transition is welded to the first surface of the flange.

3. The axle assembly according to claim 1, wherein said axle member is a solid member.

4. The axle assembly according to claim 1, wherein said spindle is a solid member.

5. The axle assembly according to claim 1, wherein said axle member is a hollow member.

6. The axle assembly according to claim 1, wherein said spindle is a hollow member.

7. The axle assembly according to claim 1, wherein said flange is a brake flange.

8. The axle assembly according to claim 1, wherein said flange is a wheel-mounting flange.

* * * * *